TRANSMITTER AND RECEIVER FOR DELTA-SIGMA CODE MODULATION SYSTEM EMPLOYING LOGIC CIRCUITS TO ACHIEVE VOLUME COMPRESSION AND EXPANSION

Filed June 12, 1967 2 Sheets-Sheet 1

INVENTOR
ROBERT FRANK BOND
BY Kemon, Palmer & Estabrook
ATTORNEYS

INVENTOR
ROBERT FRANK BOND
BY
ATTORNEYS

United States Patent Office 3,506,917

Patented Apr. 14, 1970

3,506,917

TRANSMITTER AND RECEIVER FOR DELTA-SIGMA CODE MODULATION SYSTEM EMPLOYING LOGIC CIRCUITS TO ACHIEVE VOLUME COMPRESSION AND EXPANSION

Robert Frank Bond, Denham, England, assignor to The General Electric Company Limited, London, England, a British company Filed June 12, 1967, Ser. No. 645,226
Claims priority, application Great Britain, June 14, 1966, 26,555/66
Int. Cl. H03k *13/22*
U.S. Cl. 325—38 10 Claims

ABSTRACT OF THE DISCLOSURE

A communication system employing Delta-sigma pulse code modulation wherein volume compression of the modulating signal is effected in the transmitter by means of logic circuits arranged to vary the amplitude of the pulses in the feedback signal in dependence on the number of pulses present or absent in the last-occurring pulse positions of the encoded signal. A receiver effecting volume expansion by a similar means is also described.

This invention relates to communication systems employing code modulation.

The invention relates particularly to communication systems employing code modulation of the kind wherein the encoded signal comprises a train of pulses, the density of said pulses in said train varying in accordance with the instantaneous value of a modulating signal.

In one proposed system of the kind specified the encoded signal effectively comprises selected ones of a regular series of pulses of uniform amplitude and having a repetition rate considerably higher than the highest frequency in the modulating signal, the selection of pulses being made according to whether the integral of a signal representative of the algebraic difference between the value of the modulating signal and the value of the encoded signal has a value above or below a reference value. In such a system the spacing between the pulses of the regular series may be finite or zero. One such system has been described in an article entitled "A Telemetering System by Code Modulation, $\Delta = \epsilon$ Modulation" which appears on pages 204 to 209 of the September 1962 issue of the I.R.E. Transactions on Space Electronics and Telemetry.

One disadvantage of the above-mentioned proposed system is that at otherwise suitable pulse repetition rates the dynamic range of the modulating signal which can satisfactorily be transmitted is small. In co-pending patent application No. 570,000, filed Aug. 3, 1966 in the name of R.L.T. Tudor-Owen, there is disclosed a communication system employing code modulation of the kind specified wherein this disadvantage is alleviated. In this system the encoded signal effectively comprises selected ones of a regular series of pulses of uniform amplitude and having a repetition rate considerably higher than the highest frequency in the modulating signal, the selection of pulses being made according to whether the integral of a signal representative of the algebraic difference between the value of the modulating signal and the value of a signal corresponding to the encoded signal, but in which the amplitude of the pulses varies with, and in the same sense as, the level of those frequency components of the encoded signal which correspond to the modulating signal, has a value above or below a reference value.

In the embodiment described in patent application No. 570,000, the signal corresponding to the encoded signal, but in which the amplitude of the pulses varies with, and in the same sense as, the level of those components of the encoded signal which correspond to the modulating signal, is obtained by deriving from the encoded signal the modulation signal represented by the encoded signal, and controlling the amplitude of the pulses in said signal corresponding to the encoded signal in dependence on the level of said modulation signal. It is an object of the present invention to provide an improved way of carrying out the invention forming the subject of application No. 570,000.

According to the present invention the required variation of the amplitude of the pulses in said signal corresponding to the encoded signal is obtained by increasing the amplitude of said pulses in response to the number of said pulses occurring during a period corresponding to at least two closely preceding pulse positions in said signal, being different from the number of pulses occurring during said period when the level of the modulating signal is substantially zero, and by decreasing the amplitude of said pulses in response to the number of said pulses occurring during said period being equal to the number of said pulses occurring during said period when the level of the modulating signal is substantially zero.

A system in accordance with the present invention has the advantage that the required pulse amplitude variation can be performed in a logical manner and does not require the actual recovery from the encoded signal of the modulation signal represented by the encoded signal.

The present invention also provides a receiver for use in a communication system in accordance with the present invention comprising: means for deriving from the received signal a signal corresponding to the transmitted encoded signal; means for increasing the amplitude of the pulses in the derived signal in response to the number of said pulses during a period corresponding to at least two closely preceding pulse positions in said derived signal being different from the number of said pulses occurring during that period when the level of the modulating signal represented by the transmitted encoded signal is substantially zero, and for decreasing the amplitude of said pulses when the number of said pulses occurring during that period is equal to the number of said pulses occurring during said period when the level of the modulating signal represented by the transmitted encoded signal is substantially zero; and means for deriving from the modified signal the modulating signal represented by said modified signal.

One communication system in accordance with the invention and suitable for the transmission of audio frequency signals will now be described, by way of example, with reference to the accompanying drawing in which.

Figure 1:
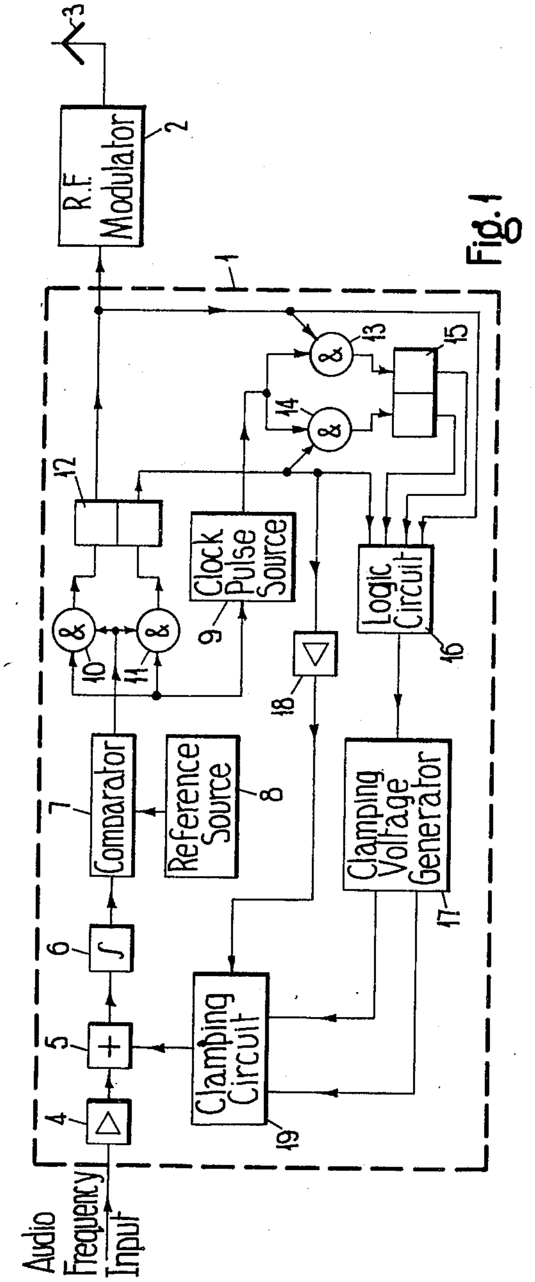
FIGURE 1 is a block schematic diagram of a transmitter in the system.

Referring now to FIGURE 1, the transmitter incorporates a code modulator 1 wherein the audio frequency signal to be transmitted is encoded into pulse form. The encoded signal is fed to a modulator 2 where it is utilized to amplitude modulate a radio frequency carrier wave in conventional manner, and the modulated carrier wave is fed to an aerial 3.

In the code modulator 1 the audio frequency signal to be transmitted is fed via an amplifying circuit 4 to an adding circuit 5 where it is added to a signal derived from the output of the modulator 1, the precise form of this signal being explained below. The resulting signal is fed via an integrator 6 to a comparator 7 whose output indicates whether the value of the integrated signal at its input is above or below a reference value supplied by a source 8.

The modulator 1 further includes a source of clock pulses 9 having a repetition frequency considerably greater than the highest frequency present in the audio frequency signal to be transmitted. The output of the pulse source 9 is supplied to the inputs of two gate circuits 10 and 11 which form a pulse selection circuit and are controlled by the output of the comparator 7 so that only one gate circuit 10 is open when the value of the integrated signal is above the reference value, and only the other gate circuit 11 is open when the value of the integrated signal is below the reference value. The outputs of the gate circuits 10 and 11 are utilised to control a pulse generator comprising a bistable trigger circuit 12 so that, when one gate 10 is open, each pulse produced by the pulse source 9 will operate the trigger circuit 12 into one of its conditions, or maintain it in that condition, and, when the other gate circuit 11 is open, each pulse produced by the pulse source 9 will operate the trigger circuit 12 into its other condition, or maintain it in that other condition.

From the trigger circuit 12 there is derived a first output signal which effectively comprises a series of pulses, each having a duration equal to the period of the clock pulses, there being one pulse for each clock pulse passed by the gate circuit 10. This signal thus effectively comprises selected ones of a regular series of pulses of uniform amplitude having a repetition rate equal to that of the clock pulses and a duration equal to the period of the clock pulse signal so that the spacing between the pulses of the regular series of zero, selection of pulses being made according to whether the value of the integrated signal is above or below the reference value.

This pulse signal constitutes the encoded signal output of the code modulator 1, and is fed to the radio frequency modulator 2 as described above.

A second output is also derived from the trigger circuit 12 which is the inverse of the first-mentioned output, and the first and second outputs of the trigger circuit 12 are utilised to control respectively two further gate circuits 13 and 14. Clock pulses from the source 9 are supplied via the gates 13 and 14 to a second bistable trigger circuit 15 from which two outputs are derived, one output being the inverse of the other.

In operation, each clock pulse fed to the trigger circuit 12 via the gates 10 and 11 produces a corresponding pulse at one or the other of the outputs of the trigger circuit 12. Each such pulse opens one or other of the gates 13 and 14 so that the subsequent clock pulse produces a corresponding pulse at one or the other of the outputs of the trigger circuit 15. Thus the trigger circuits 12 and 15, together with gates 10, 11, 13 and 14, operate together as a two stage binary shift register, the outputs of the trigger circuit 15 corresponding to the outputs of the trigger circuit 12 but being delayed by one pulse position with respect to the outputs of the trigger circuit 12.

The two outputs of each of the trigger circuits 12 and 15 are fed to a logic circuit 16 which is arranged to produce an output signal which has one or the other of two values in dependence on whether the two trigger circuits 12 and 15 are in the same condition or in opposite conditions. Thus the output signal of the logic circuit 16 has one value if pulses were present in both or neither of the last-occurring pulse positions in the encoded signal, and its other value if a pulse was present in only one of the two last-occurring pulse positions in the encoded signal.

The output of the logic circuit 16 is applied to a clamping voltage generator 17 which is arranged to produce two clamping voltages of opposite polarity and equal magnitude with respect to a reference value equal to the mean value of the audio frequency signal at the output of the amplifier 4. The magnitudes of the clamping voltages are arranged to increase with time towards a maximum value when the output of the logic circuit 16 has its one value and to decrease correspondingly towards a minimum value when the output of the logic circuit 16 has its other value. Thus, the clamping voltages tend towards a minimum value when only one pulse occurs during the two last-occurring pulse positions in the encoded signal, and the clamping voltages tend to increase towards a maximum value when pulses are present in both or neither of the two last-occurring pulse positions in the encoded signal.

The second output of the trigger circuit 12, in addition to being utilised to control the gate 14, is fed via an amplifying circuit 18 to a clamping circuit 19. In the clamping circuit 19, the peaks of the positive-going excursions and the peaks of the negative-going excursions of the amplified second output signal of the trigger circuit 12 are respectively clamped at the value of the output of the clamping voltage generator 17 which is positive with respect to the reference level and the output of the clamping voltage generator 17 which is negative with respect to the reference level. The output of the clamping circuit 19 thus comprises a pulse signal which is effectively the inverse of the encoded signal fed to the radio frequency modulator 2 but in which the amplitude of the pulses varies with the magnitude of the outputs of the clamping voltage generator 17.

The output of the clamping circuit 19 is fed to the adding circuit 5 so that the output of the adding circuit 5 is a signal representative of the algebraic difference between the value of the audio frequency signal to be transmitted and the value of a pulse signal corresponding to the encoded signal fed to the radio frequency modulator 2, but in which the amplitude of the pulses varies with the magnitudes of the outputs of the clamping voltage generator 17.

It may be shown that the number of pulses appearing in unit time in the encoded signal varies with the instantaneous value of the audio signal applied to the input of the code modulator 1, the number of pulses appearing in unit time being substantially equal to half the clock pulse frequency with pulses appearing in the alternate pulse positions when the instantaneous value of the audio signal is zero, and the number of pulses being correspondingly larger or smaller when the instantaneous value is above or below zero.

As explained above, the clamping voltages tend to increase when pulses are present in both or neither of the two last-occurring pulse positions in the encoded signal. These conditions occur with increasing frequency as the instantaneous value of the modulating signal represented by the encoded signal departs in either direction from zero, and occur with decreasing frequency as the instantaneous value of the modulating signal approaches zero from either direction. Thus, the clamping voltages tend to vary with the instantaneous value of the audio signal represented by the encoded signal. The time constants associated with the clamping voltage generator circuit 17, however, are relatively large compared with the period of the audio frequencies to be transmitted. As a result, the clamping voltages vary with the level rather than the instantaneous value of the audio signal representded by the encoded signal.

The maximum audio signal level which the code modulator 1 can satisfactorily handle with a given clock pulse frequency corresponds to the minimum audio signal level for which, at the positive, peaks, every clock pulse produces a corresponding pluse in the first output of the trigger circuit 12, and, at the negative peaks, no clock pulse produces a corresponding pulse in the first output of the trigger circuit 12. If the clamping arrangement were omitted and the encoded signal were fed back directly to the adding circuit 5, then, assuming the code modulator 1 has a linear input/output characteristic, the change in the number of pulses occurring in unit time in the code modulator output for unit change in the instantaneous value of the audio input signal would have a certain substantially constant value. With the clamping arrangement included, due to the variation of the amplitude of the pulses in the signal fed back to the adder 5 from the output of the code modulator 1 with the level of the audio signal represented by the encoded signal, the change in the number of pulses occurring in unit time in the code modulator output resulting from unit change in the instantaneous value of the audio input signal varies with and in the opposite sense to the level of the audio signal represented by the encoded signal. The range of audio input signal levels which the code modulator can handle is thus increased.

It will be appreciated that the audio signal represented by the output of the code modulator 1 has a smaller dynamic range than the audio signal applied to the code modulator. The effect produced by the clamping circuit 19 is thus similar to that produced by feeding the audio signal to be transmitted to the input of the code modulator 1 via a compressor. The arrangement described, however, is relatively simple compared with a compressor, particularly in view of the fact that the compressor would be required to operate at low input signal levels.

Figure 2:
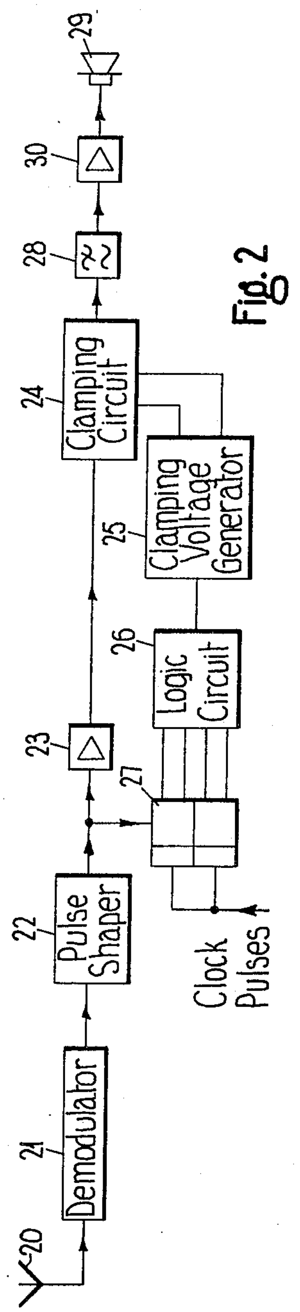
FIGURE 2 is a block schematic diagram of a receiver in the svstem.

Referring now to FIGURE 2, at a receiver of the system, the transmitted signal is picked up by an aerial 20 and its envelope detected in conventional manner in a demodulator 21. The resultant signal is then fed to a pulse shaping circuit 22 to provide a pulse signal corresponding to the encoded signal produced in the transmitter. The reshaped signal is then fed via an amplifier 23 to a clamping circuit 24, which operates in a similar manner to the claming circuit 19 in the transmitter, and serves to vary the amplitude of the pulses in the signal applied to it, with and in the same sense as the level of the audio signal represented by the signal at the output of the pulse shaping circuit 22.

Clamping is effected in a similar manner to that used in the transmitter, the clamping voltages being derived from a clamping voltage generator 25 which is controlled by means of a signal indicative of the number of pulses in the two last-occurring pulse positions in the signal at the output of the pulse shaping circuit 22. This last-mentioned signal is developed in a logic circuit 26, corresponding to the logic circuit 16 in the transmitter, which is controlled by signals from a two stage binary shift register 27 which corresponds to the trigger circuits 12 and 15 and the gates 10, 11, 13 and 14 in the transmitter.

The output of the clamping circuit 24 is fed to a low pass filter 28 and the audio signal appearing at the output of the filter 28 is fed to a loudspeaker 29 via an audio amplifier 30.

It will be appreciated that the degree of variation of the amplitude of the pulses of the received encoded signal effected by the clamping arrangement is arranged to be such as to compensate for the volume compression effected by the clamping arrangement in the transmitter. The dynamic range of the audio signal fed to the loudspeaker 29 is thus the same as the dynamic range of the audio input signal fed to the code modulator 1 in the transmitter.

The logic circuit 16, the clamping voltage generator 17 and the clamping circuit 19 in the transmitter described above with reference to FIGURE 1 will now be described in detail.

Figure 3:
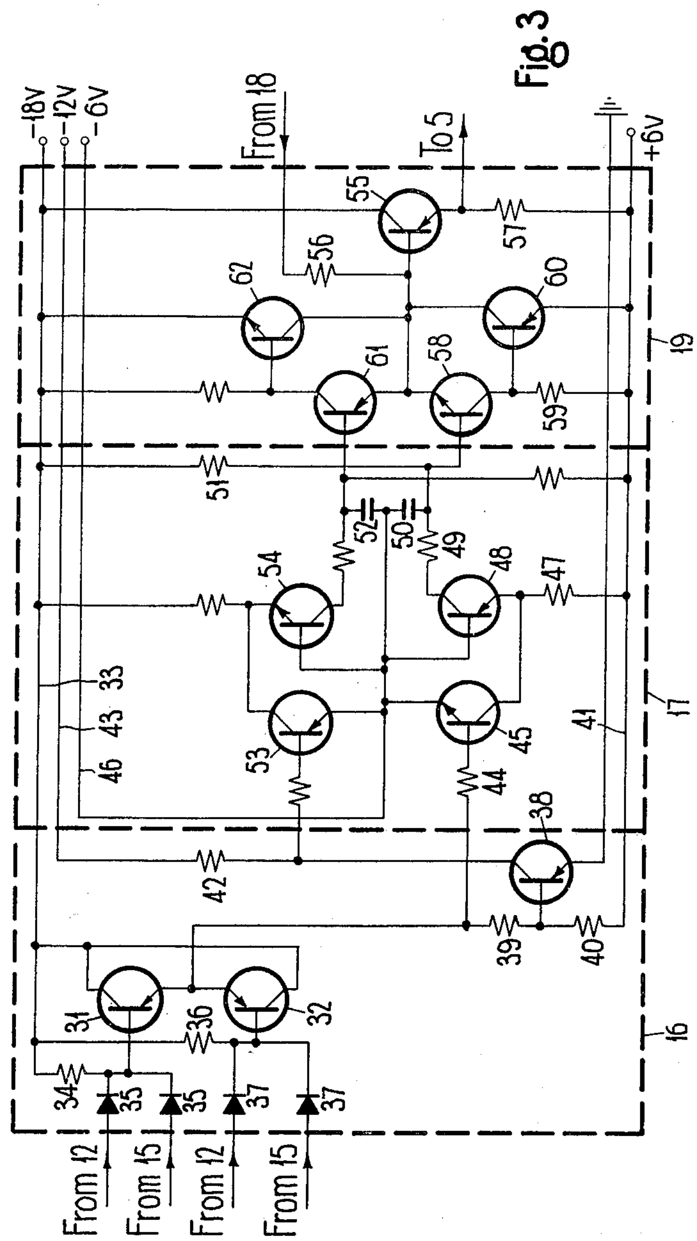
FIGURE 3 is a circuit diagram of parts of the transmitter shown in FIGURE 1.

Referring to FIGURE 3, the logic circuit 16 incorporates two similar PNP transistors 31 and 32 whose collectors are connected to a line 33 which is maintained at a potential of 18 volts negative with respect to ground. The base of the transistor 31 is connected to the line 33 via a resistor 34 and to the cathodes of two diodes 35. The first output of the trigger circuit 12 is applied to the anode of one of the diodes 35 and the second output of the trigger circuit 15 is applied to the anode of the other diode 35. The base of the transistor 32 is similarly connected to the line 33 via a resistor 36 and to the cathodes of two diodes 37 to whose anodes the second output of the trigger circuit 12 and the first output of the trigger circuit 15 are respectively applied.

The logic circuit 16 further includes a PNP transistor 38 whose base is connected to the junction of two resistors 39 and 40 of equal value which are connected in series between the emitters of the transistors 31 and 32 and a line 41 which is maintained at a potential of 6 volts positive with respect to ground. The emitter of the transistor 38 is connected to ground and the collector of the transistor 38 is connected via a resistor 42 to a line 43 which is maintained at 12 volts negative with respect to ground.

The logic circuit provides two outputs which are the inverse of one another, these outputs appearing at the emitters of the transistors 31 and 32 and the collector of the transistor 38 respectively.

The output of the logic circuit appearing at the emitters of the transistors 31 and 32 is applied via a resistor 44 to the base of an NPN transistor 45 incorporated in the clamping voltage generator 45 being connected to a line 46 which is maintained at 6 volts negative with respect to ground. The collector of the transistor 45 is connected to the line 41 via a resistor 47 and also to the emitter of a PNP transistor 48. The base of the transistor 48 is connected to the line 46 and the collector of the transistor 48 is connected via a resistor 49 to one terminal of a capacitor 50, this terminal of the capacitor 50 also being connected to the line 33 via a resistor 51, and the other terminal of the capacitor 50 being connected to the line 46. The voltage developed across the capacitor 50 constitutes one of the clamping voltages produced by the clamping voltage generator 17.

The other clamping voltage is developed across a capacitor 52 in dependence on the output of the logic circuit 16 which appears at the collector of the transistor 38 by means of a PNP transistor 53 and an NPN transistor 54 which are connected in corresponding circuit arrangements to the transistors 45 and 48 respectively, these transistors 53 and 54 being energized from the line 33.

The clamping circuit 19 incorporates a PNP transistor 55 to the base of which the output of the amplifier 18 is applied via a resistor 56, the collector of the transistor 55 being connected to the line 33 and the emitter of the transistor 55 being connected via a resistor 57 to the line 41.

The potential at the terminal of the capacitor 50 remote from the line 46 is applied to the base of an NPN transistor 58 whose emitter is connected to the base of the transistor 55, and whose collector is connected via a resistor 59 to the line 41. The transistor 58 is associated with a PNP transistor 60 to form a high current gain arrangement, the base of the transistor 60 being connected to the collector of the transistor 58 and the emitter and collector of the transistor 60 being respectively connected to the line 41 and the emitter of the transistor 58.

The clamping potential at the terminal of the capacitor 52 remote from the line 46 is similarly applied to the base of a PNP transistor 61 which is associated with an NPN transistor 62 to form a high current gain arrangement, the transistors 61 and 62 being interconnected in a corresponding manner to the transistors 58 and 60, but being energized from the line 33.

The output of the clamping circuit 19 is derived from across the resistor 57.

In operation, the first output of the trigger circuit has a value of approximately 12 volts negative with respect to ground when a pulse is present in the last-occuring pulse position in the encoded signal and a value of approximately 3 volts negative with respect to ground when a pulse is not present in the last-occurring pulse position in the encoded signal. The trigger circuit 15 produces corresponding outputs in respect of the next-to-last-occurring pulse position in the encoded signal. Thus, the anodes of both diodes 35 or both diodes 37 are at a potential of 12 volts negative only when a pulse is present in one only of the two last-occuring pulse positions in the encoded signal; under other conditions, the anode of one of the diodes 35 and the anode of one of the diodes 37 are at a potential of 3 volts negative.

The base of the transistor 31 takes up the more positive of the potentials at the anodes of the diodes 35 and the base of the transistor 32 takes up the more positive of the potentials at the anodes of the diodes 37, and the emitters of the transistors 31 and 32 take up the more negative of the potentials at the bases of the transistors 31 and 32. Thus, the emitters of the transistors 31 and 32 are at a potential of 12 volts negative only when a pulse is present in one only of the two last-occuring pulse positions in the encoded signal, and under other conditions are at a potential of 3 volts negative. An inverse output appears at the collector of the transistor 38.

When the emitters of the transistors 31 and 32 are at 3 volts negative, the transistor 45 is conducting and the transistor 48 is non-conducting; the capacitor 50 consequently charges up via the resistor 51. When the emitters of the transistors 31 and 32 are at 12 volts negative the transistor 48 becomes conducting causing the capacitor 50 to discharge. Thus, the voltage across the capacitor 50 varies with the number of pulses present in the two last-occurring pulse positions in the encoded signal, the values of the resistors 47, 49 and 51 being chosen so that the voltage across the capacitor 50 can change only relatively slowly so that it varies with the level of the audio signal represented by the encoded signal, rather than the instantaneous value of this audio signal.

A corresponding voltage of equal magnitude, but opposite polarity, is produced across the capacitor 52 under the control of transistors 53 and 54.

The signal applied to the resistor 56 from the amplifier varies in potential from 18 volts negative with respect to ground to 6 volts positive. When the potential at the base of the transistor 55 goes more negative than the potential at the terminal of the capacitor 50 remote from the line 46, the transistors 58 and 60 start to conduct thus preventing the potential at the base of the transistor 55 going appreciably more negative than the potential at this terminal of the capacitor 50. Similarly, the transistors 61 and 62 serve to prevent the potential at the base of the transistor 55 from going appreciably more positive than the potential at the terminal of the capacitor 52 remote from the line 46.

Thus, the peak-to-peak amplitude of the voltage appearing across the resistor 57 is limited to the difference between the potentials at the terminals of the capacitors 50 and 52 remote from the line 46, and thus varies with, and in the same sense as the level of the audio signal represented by the encoded signal.

The circuits of the logic circuit 26, the clamping voltage generator 25 and the clamp 24 in the receiver are substantially the same as the corresponding circuits in the transmitter described above with reference to FIGURE 3.

In the transmitter and receiver described above with reference to FIGURES 1, 2 and 3 the required amplitude variation is effected by evaluating the number of pulses present in the two last-occurring pulse positions in the encoded signal. It will be appreciated that in other arrangements in accordance with the invention the required variation may be effected by evaluating the number of pulses in more than the two last-occurring pulse positions. In one such arrangement the logic circuit responds to the number of pulses in the three last-occurring pulse positions, and the clamping voltage is arranged to increase towards a maximum value when pulses are present in all or none of the three last-occuring pulse positions, and the decrease towards a minimum value whenever pulses are present in some only of the three last-occurring pulse positions.

In further alternative arrangements in accordance with the invention, the logic circuit may be arranged to respond to the number of pulses in two or more pulse positions which, while not being the last-occurring pulse positions, precede the last-occurring pulse positions sufficiently closely for the evaluation effected by the logic circuit to be indicative of the contemporary level of the modulating signal.

It will be appreciated that, while in the transmitter and receiver described above the variation of pulse amplitude is effected in a symmetrical manner involving the generation of two clamping voltages of equal magnitudes but opposite polarities, in other arrangements in accordance with the invention the variation may be effected asymmetrically using one clamping voltage only.

I claim:

1. In a transmitter for use in a code modulation communication system comprising:

(a) an input path via which a modulating signal is applied to the transmitter;

(b) a source of clock pulses at a repetition rate considerably greater than the highest frequency in the modulating signal required to be transmitted;

(c) pulse selection means to which an output from said source of clock pulse is applied;

(d) pulse generating means for producing in response to the output of said pulse selection means a train of pulses of regular amplitude and duration, in which train there is one pulse for each pulse in the output of said pulse selection means;

(e) means for transmitting said series of pulses of regular amplitude and duration;

(f) comparator means, having first and second inputs, for controlling said pulse selection means so that clock pulses from said source are selected by said pulse selection means only when the values of a signal applied to the first input of said comparator means differs in a predetermined sense from the value of a reference signal applied to the second input of said comparator means;

(g) integrating means whose output is applied to said first input of said comparator means;

(h) means for applying to the input of said integrating means a signal representative of the algebraic difference between the values of the modulating signal and a pulse signal derived from the output of said pulse generating means; and (j) means for varying the amplitude of the pulses in said pulse signal derived from the output of said pulse generating means so as to effect volume compression of the modulating signal in the transmitted signal the improvement in that said means for varying the amplitude of the pulses comprises:

(i) a logic circuit whose output has a first value when the number of pulses occurring in the output signal of said pulse generating means during a period corresponding to at least two closely preceding pulse positions differs from the number of pulses occurring during said period when the level of said modulating signal is substantially zero, and a second value when the number of pulses in said pulse signal occurring during said period is equal to the number of pulses occurring during said period when the level of said modulating signal is substantially zero;

(ii) voltage generating means for producing at least one voltage whose magnitude increases with time towards a maximum value when the output of the logic circuit has its first value and decreases with time when the output of the logic circuit has its second value; and (iii) means for producing a signal corresponding to the output of said pulse generating means but in which the amplitude of the pulses varies with the magnitude of said voltage produced by said voltage generating means.

2. A transmitter according to claim 1 wherein the logic circuit responds to the number of pulses in at least the two last-occurring pulse positions in the output of said pulse generating means, and the output of the logic circuit has its first value when pulses are present in all or none of said last-occurring pulse positions, and has its second value when pulses are present in some only of said last-occurring pulse positions.

3. A transmitter according to claim 2 wherein the logic circuit responds to the number of pulses in the two last-occurring pulse positions in the output of said pulse generating means, and the logic circuit has a pulse generating input to which the output of said first means is applied directly and a second input to which the output of said pulse generating means is applied via a two stage binary shift register.

4. A transmitter according to claim 1 wherein said voltage generating means includes a capacitance across which said voltage produced by the voltage generating means is developed, and means for charging said capacitance when the output of said logic circuit has its first value and for discharging said capacitance when the output of said logic circuit has its second value.

5. A transmitter according to claim 1 wherein said voltage generating means produces two voltages of equal magnitudes but opposite polarities with respect to a reference value which is dependent on the mean value of the modulating signal, the positive-going and negative-going excursions of said signal corresponding to the output of said pulse generating means being respectively clamped at the values of said two voltages of equal magnitudes.

6. In a receiver for use in a communication system employing code modulation of the kind wherein the encoded signal comprises a train of pulses, the density of the pulses in said train varying in accordance with the instantaneous value of a modulating signal and the modulating signal being effectively subjected to volume compression during transmission, the receiver comprising: first means for deriving from the received signal a signal corresponding to the transmitted encoded signal; second means for producing a signal corresponding to the output signal of said first means, but in which the amplitude of the pulses varies in such a manner as to compensate for the volume compression of the modulating signal in the received signal; and third means for deriving the modulating signal represented by the output of said second means, the improvement in that said second means comprises:

(i) a logic circuit whose output has a first value when the number of pulses occurring in the output signal of said first means during a period corresponding to at least two closely preceeding pulse positions differs from the number of pulses occurring during said period when the level of said modulating signal represented by the output of said means is substantially zero, and a second value when the number of pulses in the output signal of said first means during said period is equal to the number of pulses occurring during said period when the level of said modulating signal represented by the output of said first means is substantially zero;

(ii) voltage generating means for producing at least one voltage whose magnitude increases with time towards a maximum value when the output of the logic circuit has its first value, and decreases with time when the output of the logic circuit has its second value; and (iii) means for producing in response to the output of said first means a signal corresponding to the output signal of said first means but in which the amplitude of the pulses varies with the magnitude of said voltage produced by said voltage generating means.

7. A receiver according to claim 6 wherein the logic circuit responds to the number of pulses in at least the two last-occurring pulse positions in the output of said first means, and the output of the logic circuit has its first value when pulses are present in all or none of said last-occurring pulse positions and has its second value when pulses are present or in some only of said last-occurring pulse positions.

8. A receiver according to claim 7 wherein the logic circuit responds to the number of pulses in the two last-occurring pulse positions in the output of said first means, and the logic circuit has a first input to which the output of said first means is applied directly and a second input to which the output of said first means is applied via a two stage binary shift register.

9. A receiver according to claim 6 wherein said voltage generating means includes a capacitance across which said voltage produced by the voltage generating means is developed, and means for charging said capacitance when the output of said logic circuit has its first value and for discharging said capacitance when the output of said logic circuit has its second value.

10. A receiver according to claim 6 wherein said voltage generating means produces two voltages of equal magnitudes but opposite polarities with respect to a reference value which is dependent on the mean value of the modulating signal represented by the output of said first means, and said second means comprises means for clamping the positive-going and negative-going excursions of said signal corresponding to the output of said first means respectively at the values of said two voltages of equal magnitudes.

References Cited

UNITED STATES PATENTS

| | | | |
|---|---|---|---|
| 2,662,113 | 12/1953 | Schouten et al. | 325—38 XR |
| 2,724,740 | 11/1955 | Cutler | 325—38 XR |
| 2,897,275 | 7/1959 | Bowers | 325—38 XR |
| 3,249,870 | 5/1966 | Greefkes | 325—38 |
| 3,267,391 | 8/1966 | Balder et al. | 325—38.1 |
| 3,384,823 | 5/1968 | Southworth | 325—38 |

ROBERT L. GRIFFIN, Primary Examiner

C. R. VON HELLENS, Assistant Examiner

U.S. Cl. X.R.

325—324; 332—11